US010597788B2

(12) United States Patent
Reytier et al.

(10) Patent No.: US 10,597,788 B2
(45) Date of Patent: Mar. 24, 2020

(54) METHODS FOR (CO)ELECTROLYSIS OF WATER (SOEC) OR FOR PRODUCING ELECTRICITY AT A HIGH TEMPERATURE WITH EXCHANGERS INCORPORATED AS STAGES OF A REACTOR STACK (HTE) OR A FUEL CELL (SOFC)

(71) Applicant: COMMISSARIAT A L'ENERGIE ATOMIQUE ET AUX ENERGIES ALTERNATIVES, Paris (FR)

(72) Inventors: Magali Reytier, Villard de Lans (FR); Philippe Szynal, Chignin (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 7 days.

(21) Appl. No.: 15/744,144

(22) PCT Filed: Jul. 8, 2016

(86) PCT No.: PCT/EP2016/066304
§ 371 (c)(1),
(2) Date: Jan. 12, 2018

(87) PCT Pub. No.: WO2017/009238
PCT Pub. Date: Jan. 19, 2017

(65) Prior Publication Data
US 2018/0202055 A1 Jul. 19, 2018

(30) Foreign Application Priority Data
Jul. 16, 2015 (FR) .................... 15 56727

(51) Int. Cl.
*C25B 1/08* (2006.01)
*C25B 9/20* (2006.01)
(Continued)

(52) U.S. Cl.
CPC .............. *C25B 1/08* (2013.01); *C25B 1/00* (2013.01); *C25B 9/206* (2013.01); *C25B 15/02* (2013.01);
(Continued)

(58) Field of Classification Search
CPC .. C25B 1/00; C25B 1/08; C25B 9/206; C25B 15/02; H01M 8/0247; H01M 8/04014;
(Continued)

(56) References Cited

U.S. PATENT DOCUMENTS 4,336,122 A    6/1982  Spirig
4,574,112 A    3/1986  Breault et al.
(Continued)

FOREIGN PATENT DOCUMENTS

WO    2005/122302 A2    12/2005
WO    2009/040335 A2     4/2009
(Continued)

OTHER PUBLICATIONS

International Search Report dated Aug. 22, 2016. in PCT/EP2016/066304 filed Jul. 8, 2016.
(Continued)

*Primary Examiner* — Ciel P Thomas
(74) *Attorney, Agent, or Firm* — Oblon, McClelland, Maier & Neustadt, L.L.P.

(57) ABSTRACT

The invention relates to the production or a heat-transfer gas circuit for the heat management/regulation of the stack of an HTE reactor or an SOFC fuel cell by removing certain cells in certain areas of the stack in order to replace them with electrical contact elements that allow the heat transfer gas to pass through.

17 Claims, 7 Drawing Sheets

Figure 3:
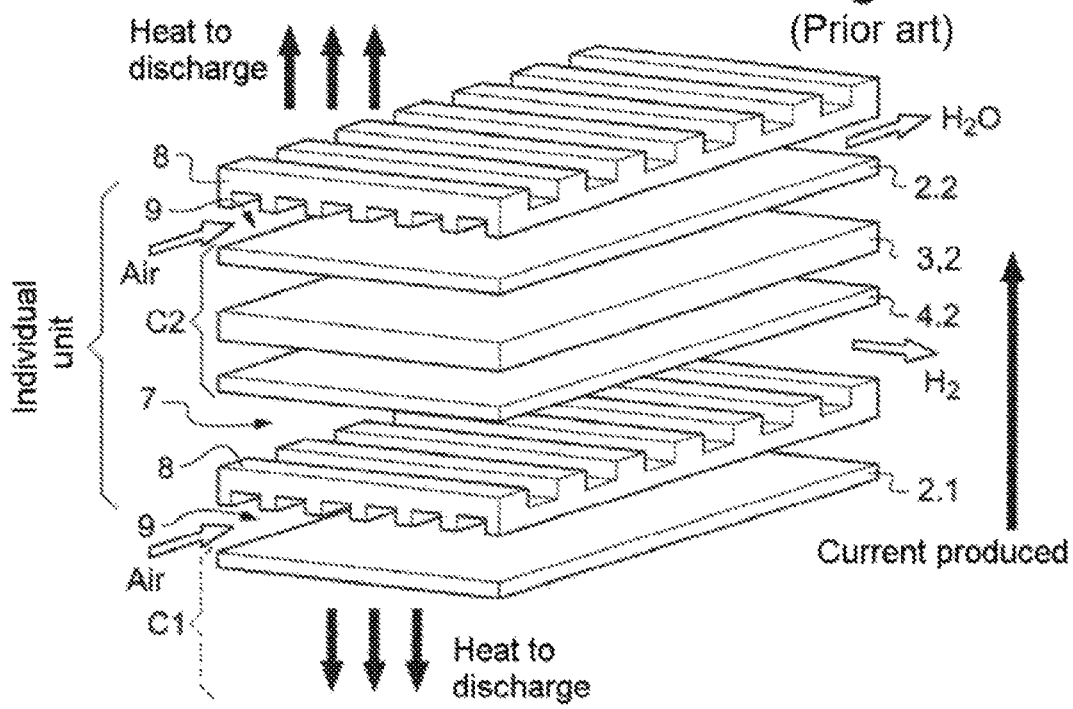

(51) Int. Cl.
*C25B 15/02* (2006.01)
*C25B 1/00* (2006.01)
*H01M 8/02* (2016.01)
*H01M 8/04* (2016.01)
*H01M 8/24* (2016.01)
*H01M 8/0247* (2016.01)
*H01M 8/04014* (2016.01)
*H01M 8/04701* (2016.01)
*H01M 8/2425* (2016.01)

(52) U.S. Cl.
CPC ..... *H01M 8/0247* (2013.01); *H01M 8/04014* (2013.01); *H01M 8/04701* (2013.01); *H01M 8/2425* (2013.01); *Y02E 60/368* (2013.01)

(58) Field of Classification Search
CPC ............ H01M 8/04701; H01M 8/2425; Y02E 60/368
See application file for complete search history.

(56) References Cited

U.S. PATENT DOCUMENTS

| | | | |
|---|---|---|---|
| 2005/0064270 | A1 | 3/2005 | Marianowski |
| 2006/0105213 | A1 | 5/2006 | Otsuka |
| 2009/0169939 | A1* | 7/2009 | Devries ............... H01M 8/0267 429/423 |
| 2010/0200422 | A1 | 8/2010 | Le Gallo et al. |
| 2015/0329979 | A1 | 11/2015 | Reytier et al. |

FOREIGN PATENT DOCUMENTS

| | | |
|---|---|---|
| WO | 2011/083691 A1 | 7/2011 |
| WO | 2013/060869 A1 | 5/2013 |
| WO | 2014/097101 A1 | 6/2014 |

OTHER PUBLICATIONS

French Search Report dated Apr. 1, 2016; in French Application No. 1556727 filed Jul. 16, 2015.

* cited by examiner

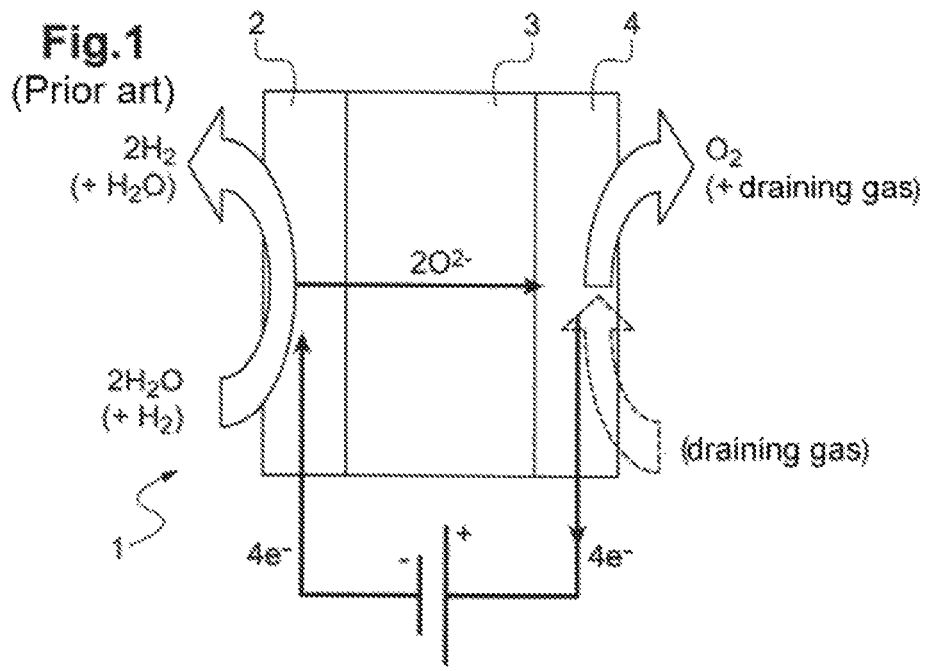
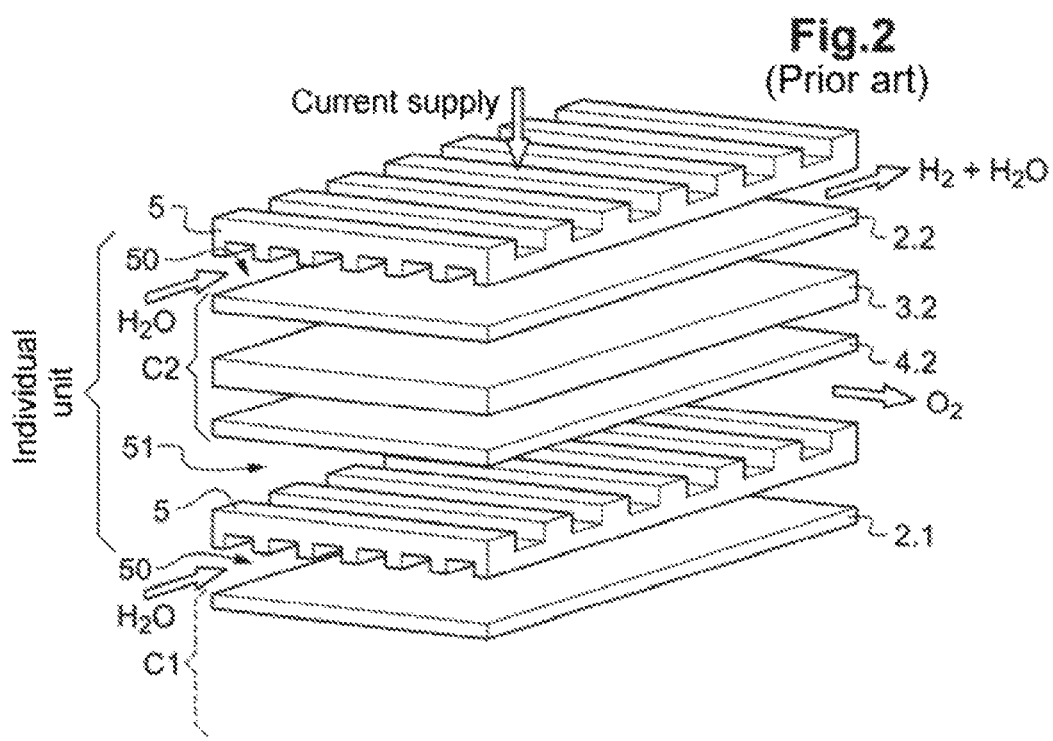

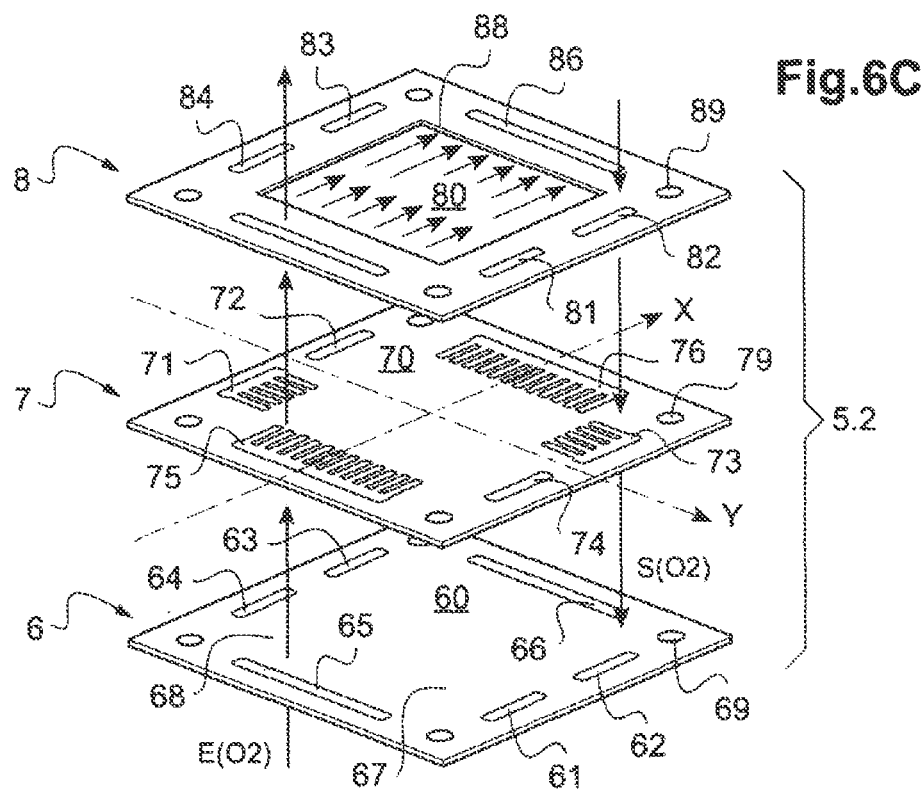
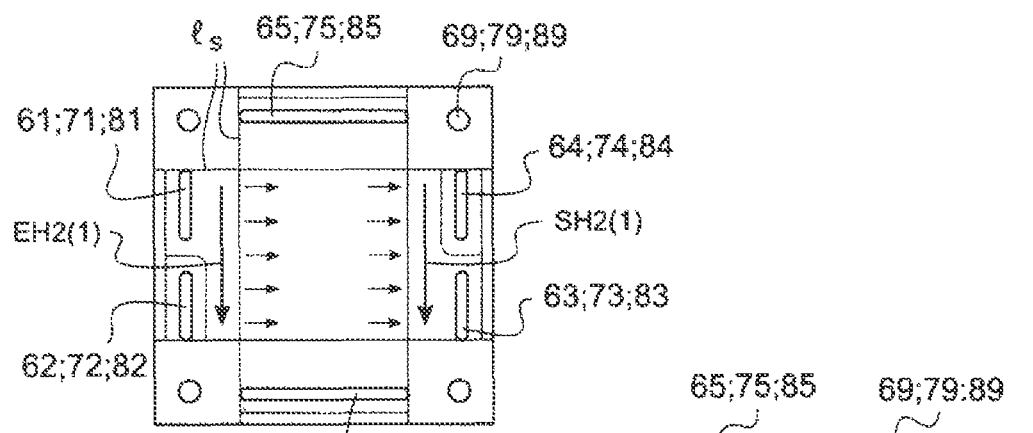
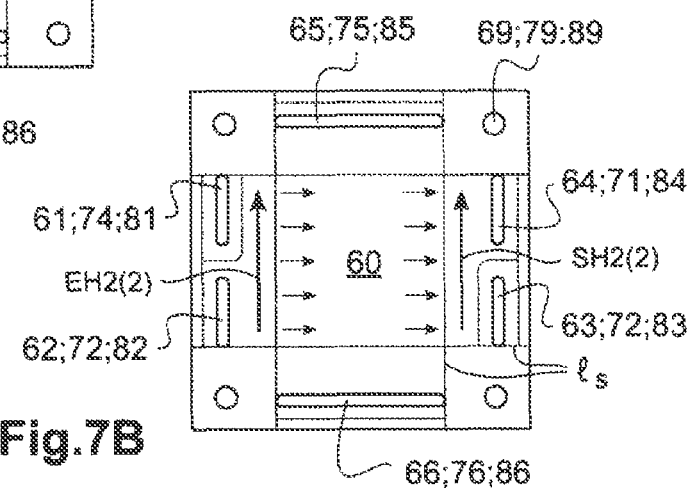

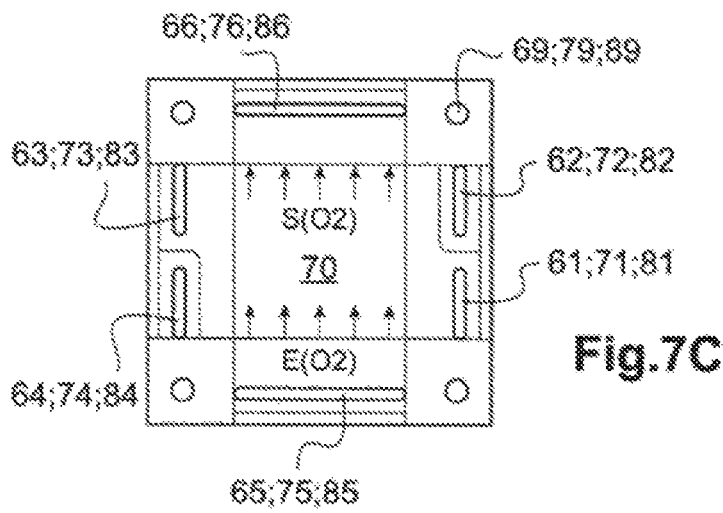
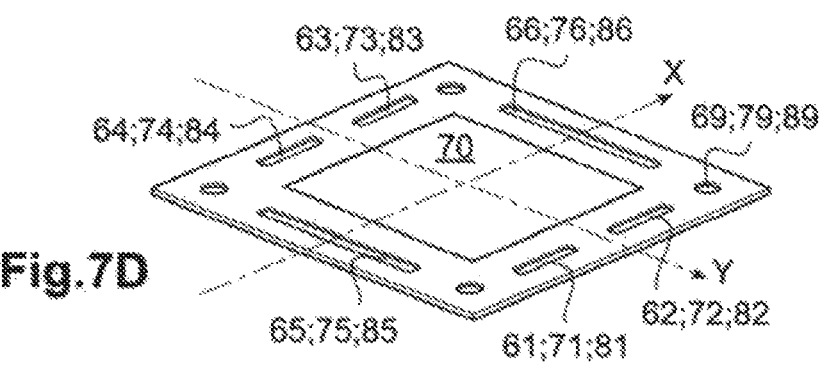
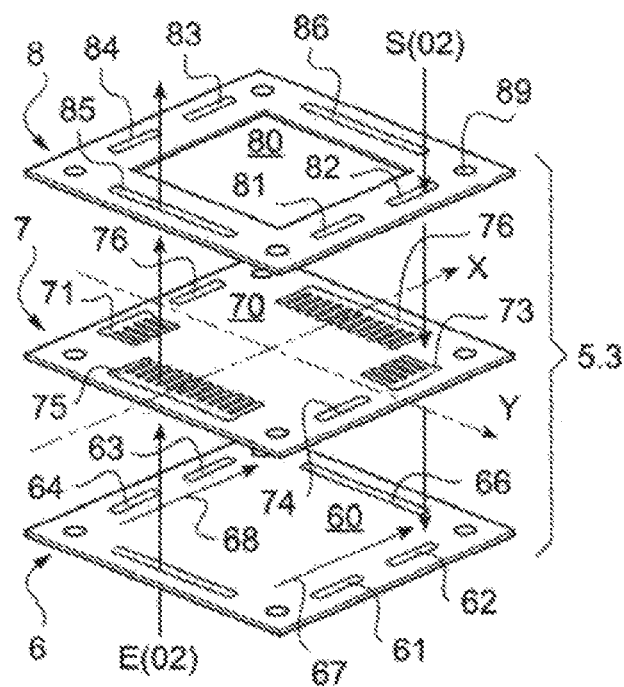

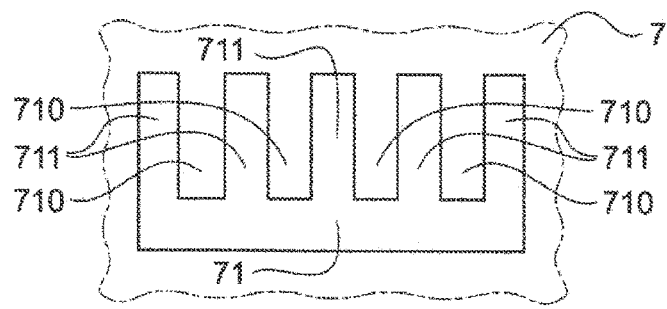
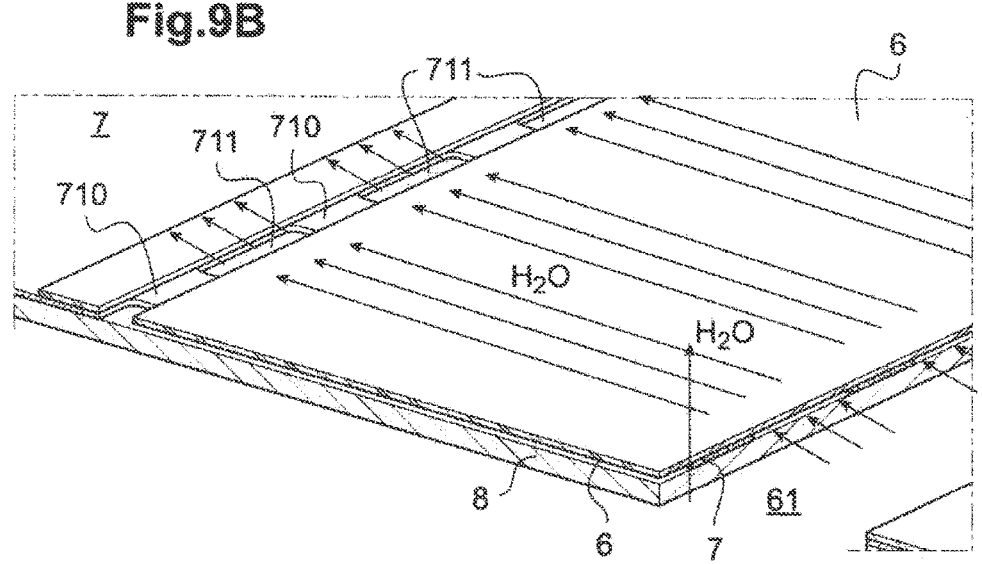

METHODS FOR (CO)ELECTROLYSIS OF WATER (SOEC) OR FOR PRODUCING ELECTRICITY AT A HIGH TEMPERATURE WITH EXCHANGERS INCORPORATED AS STAGES OF A REACTOR STACK (HTE) OR A FUEL CELL (SOFC)

TECHNICAL FIELD

The present invention relates to the field of solid oxide fuel cells (SOFC) and that of high-temperature electrolysis of water (HTE, or else HTSE, acronym for High Temperature Steam Electrolysis) also using solid oxides (SOEC, acronym for Solid Oxide Electrolysis Cell).

The invention more particularly relates to novel methods for operating a high-temperature electrolysis (HTE) of water reactor of SOEC type to produce hydrogen $H_2$ from steam $H_2O$ or a reactor for the co-electrolysis of carbon dioxide $CO_2$ and water $H_2O$ to produce synthesis gas (mixture of CO and $H_2$), or an SOFC-type fuel cell, containing a stack of individual electrochemical cells.

Although it is described mainly with reference to the application of high-temperature electrolysis of water, the invention applies equally well to the co-electrolysis of carbon dioxide $CO_2$ and water $H_2O$, or to an SOFC fuel cell supplied with $H_2$ or with methane $CH_4$ as fuel and with air or oxygen $O_2$ as oxidizer.

PRIOR ART

The electrolysis of water is an electrolytic reaction that decomposes water into gaseous dioxygen and dihydrogen by means of an electrical current according to the reaction:

$$H_2O \rightarrow H_2 + \tfrac{1}{2} O_2.$$

It is advantageous to carry out the electrolysis of water at high temperature, typically between 600 and 950° C., as some of the energy required for the reaction can be supplied by heat, which is less expensive than electricity, and activation of the reaction is more efficient at high temperature and does not require a catalyst. For implementing high-temperature electrolysis, use of an electrolyzer of the SOEC type (acronym for "solid oxide electrolyzer cell") is known, said electrolyzer consisting of a stack of individual cells, each comprising a solid oxide electrolysis cell, consisting of three layers, anode/electrolyte/cathode, superposed on one another, and of interconnection plates made of metal alloys, also referred to as bipolar plates, or interconnectors. The function of the interconnectors is to provide both passage of the electrical current and circulation of the gases in the vicinity of each cell (injected steam, hydrogen and oxygen extracted in an HTE electrolyzer; air and hydrogen injected and water extracted in an SOFC cell) and to separate the anode and cathode compartments, which are the compartments for circulation of the gases on the anode side and the cathode side of the cells, respectively. For carrying out high-temperature electrolysis HTE of steam, steam $H_2O$ is injected into the cathode compartment. Under the action of the current applied to the cell, dissociation of the water molecules in the form of steam takes place at the interface between the hydrogen electrode (cathode) and the electrolyte: this dissociation produces dihydrogen gas $H_2$ and oxygen ions. The dihydrogen is collected and discharged at the outlet of the steam/hydrogen compartment. The oxygen $O^{2-}$ ions migrate through the electrolyte and recombine into dioxygen at the interface between the electrolyte and the oxygen electrode (anode).

As shown schematically in FIG. 1, each individual electrolysis cell 1 is formed from a cathode 2 and an anode 4, placed on either side of a solid electrolyte 3. The two electrodes (cathode and anode) 2, 4 are electron conductors, made of porous material, and the electrolyte 3 is gastight, an electron insulator and an ion conductor. The electrolyte may in particular be an anion conductor, more precisely an anion conductor of the $O^{2-}$ ions and the electrolyzer is then referred to as an anion electrolyzer.

The electrochemical reactions take place at the interface between each of the electron conductors and the ion conductor.

At the cathode 2, the half-reaction is as follows:

$$2H_2O + 4e^- \rightarrow 2H_2 + 2O^{2-}.$$

At the anode 4, the half-reaction is as follows:

$$2O^{2-} \rightarrow O_2 + 4e^-.$$

The electrolyte 3 inserted between the two electrodes 2, 4 is the site of migration of the $O^{2-}$ ions under the effect of the electrical field created by the difference in potential imposed between the anode 4 and the cathode 2.

As illustrated in brackets in FIG. 1, the steam at the cathode inlet may be accompanied by hydrogen $H_2$ and the hydrogen produced and recovered at the outlet may be accompanied by steam. Likewise, as illustrated in dotted lines, a draining gas, such as air, may additionally be injected at the inlet in order to remove the oxygen produced. The injection of a draining gas has the additional role of acting as thermal regulator.

An individual electrolysis reactor consists of an individual cell as described above, with a cathode 2, an electrolyte 3 and an anode 4, and of two monopolar connectors which provide the electrical, hydraulic and thermal distribution functions.

In order to increase the flow rates of hydrogen and oxygen produced, it is known to stack several individual electrolysis cells on top of one another, separating them with interconnection devices, usually known as bipolar interconnection plates or interconnectors. The assembly is positioned between two end interconnection plates which bear the electrical supplies and gas supplies of the electrolyzer (electrolysis reactor).

An electrolysis reactor or high-temperature water electrolyzer (HTE) thus comprises at least one, generally a plurality of, electrolysis cells stacked on top of one another, each individual cell being formed of an electrolyte, of a cathode and of an anode, the electrolyte being inserted between the anode and the cathode.

The fluidic and electrical interconnection devices, which are electron conductors, are in electrical contact with one or more electrodes generally provide the functions of introducing and collecting electrical current and delimit one or more compartments for the circulation of the gases. More precisely, an interconnector provides electrical contact via one face thereof with the cathode of one cell, and via the other face thereof with the anode of the adjacent cell.

Thus, a "cathode" compartment has the role of distributing the electrical current and steam and also of recovering the hydrogen at the cathode in contact.

An "anode" compartment has the role of distributing the electrical current and also of recovering the oxygen produced at the anode in contact, optionally with the help of a draining gas.

FIG. 2 represents an exploded view of individual modules constituting the electrochemical stages of a high-temperature steam electrolyzer according to the state of the art. This HTE electrolyzer comprises a plurality of individual electrolysis cells C1, C2, . . . , of solid oxide (SOEC) type, stacked alternately with interconnectors 5. Each cell C1, C2, . . . consists of a cathode 2.1, 2.2, . . . and an anode 4.1, 4.2, . . . between which an electrolyte 3.1, 3.2, . . . is arranged. The assembly of the electrolysis cells is supplied in series by the electrical current and in parallel by the gases.

The interconnector 5 is a component made of metal alloy, which provides the separation between the cathode compartment 50 and anode compartment 51, which are defined by the volumes between the interconnector 5 and the adjacent cathode 2.1 and between the interconnector 5 and the adjacent anode 4.2, respectively. It also provides distribution of the gases to the cells. Injection of steam into each individual unit takes place in the cathode compartment 50. Collection of the hydrogen produced and of the residual steam at the cathode 2.1, 2.2, . . . takes place in the cathode compartment 50 downstream of the cell C1, C2, . . . after dissociation of the steam by the latter. Collection of the oxygen produced at the anode 4.2 takes place in the anode compartment 51 downstream of the cell C1, C2, . . . after dissociation of the steam.

The interconnector 5 provides the passage of the current between the cells C1 and C2 by direct contact with the adjacent electrodes, that is to say between the anode 4.2 and the cathode 2.1.

FIG. 3 represents an exploded view of individual modules constituting the electrochemical stages of an SOFC fuel cell according to the state of the art the same individual units as those of FIG. 2 are employed for an SOFC fuel cell with cells of individual cells C1, C2 and the interconnectors 5. The cathodes 2.1, 2.2, . . . of the HTE electrolyzer are then used as anodes in the SOFC cell and the anodes 4.1, 4.2, . . . of the HTE electrolyzer are for their part used as cathodes in SOFC cells. Thus, in operation as an SOFC cell, the injection of the air containing the oxygen into each individual unit takes place in the SOFC cathode compartment 51. The collection of the water produced at the SOFC anode is carried out in the SOFC anode compartment 50 downstream of the cell C1, C2, after recombination of water by the latter with the hydrogen $H_2$ injected in the anode 2.2 into each anode compartment upstream of the cell C1, C2. The current produced during the oxidation of the hydrogen into steam is collected by the interconnectors 5.

Thus, in a solid oxide fuel cell SOFC, the cells C1, C2, . . . , and interconnectors 5 used are the same components, but the operation is the reverse of that of an HTE electrolyzer such as has just been explained, with a reversed current direction, with air which supplies the SOFC cathode compartments and hydrogen as fuel which supplies the SOFC anode compartments.

Satisfactory operation of an HTE electrolyzer or of an SOFC fuel cell requires, inter alia, the following essential functions:

A/good electrical insulation between two adjacent interconnectors in the stack, otherwise the individual electrochemical cell inserted between the two interconnectors will be short-circuited, B/good leaktightness between the two separate compartments, i.e. anode and cathode compartments, otherwise the gases produced will recombine, resulting in a falling yield and in particular in the appearance of hot spots which damage the electrolyzer, C/good distribution of the gases both at the inlet and on recovery of the gases produced, otherwise there will be a loss of yield, nonuniformity of pressure and nonuniformity of temperature within the different individual cells, or even unacceptable deterioration of the cells.

Moreover, the operating point retained for the electrolysis reactor or the SOFC cell also sets the thermal conditions in the stack. Indeed, for electrolyses carried out at high temperature, the energy $\Delta H$ required for dissociation of the inlet molecule ($H_2O$ or $CO_2$) may be provided in electrical and/or heat form. The thermal energy provided Q is then defined as a function of the voltage U at the terminals of each electrolysis cell by the relationship:

$$Q = \frac{I}{2F}\Delta H - U \cdot I,$$

in which U is the electrical voltage, I is the electric current and F is the Faraday constant.

Thus, three operating regimes are defined for the electrolysis for the electrolysis or the co-electrolysis, corresponding to three different thermal modes for the stack of cells:

the "autothermal" mode in which the imposed voltage $U_{imp}$ is equal to $\Delta H/2$ F. The heat consumed by the dissociation reaction is completely compensated for by the various electrical resistances of the electrolyzer (irreversibilities). The electrolyzer does not require any particular thermal management, while at the same time remaining temperature-stable.

the "endothermic" mode in which the imposed voltage $U_{imp}$ is less than $\Delta H/2$ F. The electrolyzer consumes more heat than the electrical losses therein. This required heat must thus be supplied thereto by another means, otherwise its temperature will drop irreparably.

the "exothermic" mode in which the imposed voltage $U_{imp}$ is greater than $\Delta H/2$ F. The electrolysis then consumes less heat than the electrical losses via the Joule effect. This release of heat within the electrolyzer must then be discharged by another means, otherwise its temperature will increase unacceptably.

The operation of a cell supplied with methane $CH_4$, for its part, requires some precautions. Indeed, the internal reforming reaction, according to the equation $CH_4 + H_2O \rightarrow 3H_2 + CO$, catalyzed by cermet, in general nickel-zirconia cermet, of the SOFC anode supplied with $CH_4$, is highly endothermic, whereas the oxidation reaction of the hydrogen within the cell is highly exothermic. Without particular precautions, this requires managing large thermal gradients within the stack, between the inlet and the outlet of the gases, these large thermal gradients possibly being unacceptable since they induce high mechanical stresses.

Thus, the electrochemical reactions required for the operation of this type of electrolyzer stack or SOFC fuel cell may be carried out under varied electrical and thermal conditions, each with their own advantages and disadvantages.

In particular, in the endothermic mode for electrolysis, less electricity is consumed but less hydrogen is produced, and heat must be supplied to the stack. The advantage of this point of operation lies in the availability of an inexpensive heat source. Everything thus depends on the nature and the temperature of this heat source and on the design of the interconnector making it possible to best utilize this heat.

In contrast, the exothermic mode for electrolysis and for the cell leads to a substantial production either of hydrogen or of electricity, but the stack must be cooled, which may be difficult to achieve. Only a suitable design of interconnector may make cooling possible. The advantage of this exothermic mode is thus heavily dependent on the cost of the electricity and the use of the excess heat.

A significant constraint is managing as well as possible these thermal operating regimes of a fuel cell (SOFC) or of an electrolyzer (HTE). Indeed, regardless of the mode in question, the thermal gradients within the stack may be very large, which generates high, or even very high, mechanical stresses, which may go as far as breaking the cells and/or the seals. Moreover, if the stack is cooled incorrectly, temperatures may be reached which are too high, especially for the seals.

Now, the elements internal to the SOFC cell or to the electrolyzer, especially the individual cells, are at least partially produced from ceramic; these elements are thus very sensitive to temperature gradients and are not capable of withstanding a thermal shock, or too large a thermal gradient (a few tens of degrees between the inlet and the outlet of the gases).

Furthermore, in order to ensure the longevity of the cell or the electrolyzer and the correct operation thereof, it is preferable to provide a distribution of the temperature within the reactor which is as homogeneous as possible. The aim is typically to have temperatures not varying by more than 10 to 20° C. throughout the stack.

Various strategies for the thermal management/regulation of an HTE electrolyzer stack or of an SOFC cell have already been implemented.

It is important to specify beforehand that the high operating temperatures of HTE electrolyzer or of SOFC cell prohibit any cooling by means of a liquid as is the case for electrolyzers and fuel cells containing proton exchange membrane (or polymer electrolyte membrane) (PEM) as electrolyte.

Widespread solutions for cooling SOFC cells alternatively consist in:

carrying out internal reforming directly within the cell, that is to say a conversion, possible by virtue of the catalytic activity of the anode, of a mixture of methane and water according to the equation $CH_4+H_2O \rightarrow 3H_2+CO$, lowering the level of use of fuel, increasing the air flow rate.

The two latter solutions mentioned aim to discharge the heat via the gases, but this has a direct negative impact on the yield of the cell.

It is also known, from patent application WO 2009/040335, to circulate the gases within the interconnection plates themselves which then assume the role of exchanger, this solution having the advantage of being able to be implemented both for operation in an SOFC cell and for an electrolyzer.

Some designs of stack provide for the addition of tubes between the interconnection plates so as to circulate a gas with a view to discharging heat: mention may be made here of the patent application WO2005/122302.

Other designs, as described in patent application US 2006/0105213, have interconnectors with fins projecting towards the outside of the stack, in order to provide additional heat exchange with the outside environment.

Finally, the small thickness of the interconnection metal sheets limits the possibilities of cooling by radiation and thus leads to the thickening of some metal sheets, as is for example described in patent application WO2013/060869. This makes it possible to increase the predominant heat exchange by radiation and/or to be able to circulate other fluids within this type of thick plate, as described in U.S. Pat. No. 4,574,112, but has a significant negative impact on the cost of the stack, just as with the tubes between plates or the attached exchange fins.

Moreover, a stack of individual units within an HTE electrolyzer or in an SOFC cell also exhibits different limit conditions from one unit to another, adjacent unit. In particular, the individual units close to the ends of the stack may appropriately exchange heat with the outside environment, which makes it possible to manage their temperature to a certain extent.

On the other hand, the individual units at the center of the stack do not have the possibility of exchanging heat with the outside environment. For these units at the center of the stack, only the gases supplied to these zones may thus make it possible to manage heat.

There is therefore a need to improve electrolysis or co-electrolysis reactors and SOFC fuel cells operating at high temperature, especially in order to limit the thermal gradients within their stack, with a view to improving their service life while reducing the production cost of the stack, in particular by doing away with any addition of additional material or parts, such as thick interconnection plates and/or tubes and/or attached fins.

One aim of the invention is to at least partially meet this need.

SUMMARY OF THE INVENTION

To this end, the invention relates, in a first alternative, to a high-temperature electrolysis reactor, comprising an alternating stack of two groups of distinct stages, including:

a group of a plurality of stages referred to as electrochemical stages, each consisting of an individual electrolysis cell of the SOEC solid oxide type, formed from a cathode, from an anode and from an electrolyte inserted between the cathode and the anode, and of two interconnectors, each suitable for creating an electrical and fluid interconnection, arranged either side of the individual cell, a group of at least one stage referred to as thermal regulation stage(s), consisting of at least one electrical contact element allowing the gases to pass and of two interconnectors each suitable for creating an electrical and fluid interconnection, arranged either side of the contact element, the interconnectors of the electrochemical stages and of the thermal stage(s) being suitable for both:

circulating, through the stack, steam or a mixture of steam $H_2O$ and of carbon dioxide $CO_2$, a draining gas, such as air, and a heat-exchange gas, recovering the hydrogen $H_2$ produced or the synthesis gas (mixture of carbon monoxide CO and of hydrogen $H_2$) produced at the cathodes of the cells, the oxygen $O_2$ produced at the anodes of the cells, and where appropriate the draining gas, and the heat-exchange gas at the outlet of the elements, those of the interconnectors intended for the electrochemical stages being also suitable for distributing both steam or the mixture of steam $H_2O$ and of carbon dioxide $CO_2$ to the cathodes of the cells, and the draining gas to the anodes of the cells, while those of the interconnectors intended for the thermal regulation stage(s) are suitable for distributing solely the heat-exchange gas to the electrical contact element(s) allowing the gases to pass.

The invention also relates, in a second alternative, to a high-temperature fuel cell (SOFC) comprising an alternating stack of two groups of distinct stages, including:

a group of a plurality of stages referred to as electrochemical stages, each consisting of an individual electrochemical cell of the SOFC solid oxide type, formed from a cathode, from an anode and from an electrolyte inserted between the cathode and the anode, and of two interconnectors, each suitable for creating an electrical and fluid interconnection, arranged either side of the individual cell, a group of at least one stage referred to as thermal regulation stage(s), consisting of at least one electrical contact element allowing the gases to pass and of two interconnectors each suitable for creating an electrical and fluid interconnection, arranged either side of the contact element, the interconnectors of the lectrochernical stages an the thermal stage(s) being suitable for both:

circulating, through the stack, a fuel, an oxidizer, such as air, and a heat-exchange gas, recovering the surplus fuel and the water produced at the anodes of the cells, the surplus oxidizer at the cathodes of the cells and the heat-exchange gas at the outlet of the elements, those of the interconnectors intended for the electrochemical stages being also suitable for distributing both the fuel to the anodes of the cells and the oxidizer to the anodes of the cells, while those of the interconnectors intended for the thermal regulation stage(s) are suitable for distributing solely the heat-exchange gas to the electrical contact elements) allowing the gases to pass.

Preferably, the electrical contact element allowing the gases to pass is a metal grid. The element may also consist of discrete metal wires, a porous electron-conducting substrate, etc.

According to one advantageous embodiment, the interconnectors of the electrochemical stages each consist of a device consisting of three flat metal sheets, elongated along two axes of symmetry orthogonal to one another, one of the end metal sheets being intended to come into mechanical contact with the plane of a cathode of an individual cell and the other of the end metal sheets being intended to come into mechanical contact with the plane of an anode of an adjacent individual cell, in which device:

the parts of the central metal sheet and of one of the end metal sheets, referred to as first end metal sheet, are not pierced, while the central part of the other end metal sheet, referred to as second end metal sheet, is pierced, each of the three flat metal sheets is pierced, at the periphery of the central part thereof, with six ports, the first to fourth ports of each metal sheet being elongated over a length corresponding to a portion of the length of the central part along one of the axes X of the metal sheets and being distributed in pairs on either side of said axis X, while the fifth and sixth ports are elongated over a length corresponding substantially to the length of the central part along the other of the axes Y, the first end metal sheet also comprises a seventh and an eighth port arranged symmetrically on either side of the axis X, inside its first to fourth ports, and elongated over a length corresponding substantially to the length of the central part along the axis X, the second of the end metal sheets also comprises a seventh and an eighth port arranged symmetrically on either side of the axis Y inside, respectively, its fifth and its sixth port, and elongated over a length corresponding substantially to the length of the central part along said axis Y, and the first, third, fifth and sixth ports of the central metal sheet are widened relative respectively to the first, third, fifth and sixth ports of each end metal sheet, while the second and fourth ports of the three metal sheets are of substantially identical dimensions to one another, all the widened ports of the central metal sheet comprise, in their widened part, tongues of metal sheets spaced apart from one another, forming a comb, each of the slits defined between the edge of a widened slit and a tongue or between two consecutive tongues opening onto one of the inner ports of the first or second end metal sheet, the three metal sheets are laminated and assembled together such that:

the tongues of metal sheets form spacers between first and second end metal sheets, respectively, between the first and seventh ports of the first end metal sheet, between the third and eighth ports of the first end metal sheet, between the fifth and seventh ports of the second end metal sheet, and between the sixth and eighth ports of the second end metal sheet, each of the first to sixth ports of one of the three metal sheets is individually in fluid communication respectively with one of the corresponding first to sixth ports of the two other metal sheets, the first or alternatively the second port of the first end metal sheet is in fluid communication with the seventh port of the first end metal sheet via the slits of the first widened port of the central metal sheet, the third or alternatively the fourth port of the first end metal sheet is in fluid communication with the eighth port of the first end metal sheet via the slits of the third widened port of the central metal sheet, the fifth and the seventh ports of the second end metal sheet are in fluid communication via the slits of the fifth widened port of the central metal sheet, the sixth and the eighth ports of the second end metal sheet are in fluid communication via the slits of the sixth widened port of the central metal sheet.

According to this mode, at least one of the two interconnectors of the thermal regulation stages is constituted of the same device as the interconnectors of the electrochemical stages, but do not comprise the seventh and eighth ports of the second end metal sheet.

Advantageously, the two interconnectors of a same electrochemical stage are each constituted from three identical flat metal sheets, but with the central metal sheet of one of the interconnectors turned upside down relative to the central metal sheet of the other of the interconnectors.

According to an advantageous variant, it is possible to provide a number of thermal regulation stages which is different from the number of electrochemical stages.

It is also possible to provide a number of thermal regulation stages which is higher at the center of the stack than at the ends of the stack.

According to one advantageous characteristic, no thermal regulation stage is visible from the outside of the stack.

Thus, the invention essentially consists in creating a heat-exchange gas circuit intended for the thermal management/regulation of the stack of an HTE reactor or of an SOFC fuel cell by removing certain cells at certain zones of the stack to replace them with electrical contact elements which may allow the heat-exchange gas to pass.

In other words, a novel type of stack is created in an HTE reactor or an SOFC fuel cell in which the majority of the usual electrochemical stages, intended either for the (co) electrolysis of steam or for the production of electricity by the cell, are retained and stages with a thermal regulation function are added thereto instead of electrochemical stages, in order to regulate the heat of the reactions in these zones.

Compared to the solutions for thermal regulation according to the state of the art, the invention makes it possible to not have to produce specific interconnectors with additions of tubes or with excess thicknesses of plates or else with cooling fins in contact with the outside.

In particular, in the advantageous embodiment of interconnectors with three flat metal sheets laminated and assembled together, it is sufficient:

in the interconnectors intended for the electrochemical stages, to turn the central metal sheet of an interconnector upside down relative to that of an adjacent interconnector:

in the interconnectors intended for the thermal regulation stages, to remove the ports for supply and recovery of either draining gas or of oxidizer. Thus, with a lower cost, a stack is obtained in which all the interconnectors are produced with the same design of three flat metal sheets.

Thus, it is possible to produce all the interconnectors, whether they are intended for the electrochemical stages or for the thermal regulation stages, on the same production tool and with the same manufacturing ranges. In other words, the thermal regulation stages according to the invention are produced with the same manufacturing, assembling and fitting tool as in a stack not comprising these stages.

Advantageously, the heat-exchange gas may either be the fuel, such as the steam in the (co)electrolysis operating mode, or the draining gas or the oxidizer in the SOFC cell operating mode. For the two operating modes, SOFC or SOEC, provision is thus made to choose a porous material for the electrical contact, which takes into account the oxidizing or reducing nature of the atmosphere of the heat-exchange gas.

It is thus possible to carry out a supply/recovery of the heat-exchange gas both for a group of electrochemical stages and for a group of thermal regulation stages adjacent to the electrochemical stages, either in parallel by keeping the manifolds separate from one another, or in series by connecting them to one another outside the stack.

The invention does not modify the reversibility of a stack reactor which may be used equally well as an electrolysis or co-electrolysis reactor or as an SOFC cell, with hydrogen or methane as fuel.

In summary, the HTE reactors, SOFC fuel cells and the operating methods thereof according to the invention have numerous characteristics and advantages, among which mention may be made of:

regulation/management of the heat of a stack due to possibility of targeting the virtually adiabatic reaction zones at the center of the stack, coupling in series of the heat-exchange gas with the supply gas $H_2/H_2O$ for the cells, to pre-heat or cool the electrochemical stages, low-cost modifications of the design in terms of the thermal regulation stages, since these modifications consist of the replacement of solid oxide cells with electrical contact elements such as metal grids, and in teens of the interconnectors intended solely for the non-piercing of ports for the supply and recovery of oxidizer gas, and hence the absence of constraints of producing interconnectors with thick plates or with specific tubes for circulating heat-exchange gas, less expensive production of the assembly of the interconnectors compared to those of the solutions of the state of the art, since the manufacturing means, the manufacturing and fitting ranges are identical for all the interconnectors with laminated and assembled flat metal sheets.

Another subject of the invention is a method for the high-temperature electrolysis of steam $H_2O$, or the co-electrolysis of steam $H_2O$ and of carbon dioxide $CO_2$, implemented in a reactor according to one described above, according to which:

the steam ($EH_2(1)$) or a mixture of steam $H_2O$ and of carbon dioxide $CO_2$ are supplied from the interconnectors of the electrochemical stages as fuel, and it is distributed to the cathodes of the cells, then the hydrogen $H_2$ produced ($SH_2(1)$) or the synthesis gas (mixture of carbon monoxide CO and of hydrogen $H_2$) is recovered at the outlet of the cathodes, a draining gas, such as air, ($E(O_2)$), is supplied from the interconnectors of the electrochemical stages and it is distributed to the anodes of the cells, then the oxygen $O_2$ produced and where appropriate the draining gas ($S(O_2)$) is recovered at the outlet of the anodes, a heat-exchange gas ($EH_2(2)$) is supplied from the interconnectors of the thermal regulation stages and it is distributed to the electrical contact elements, then it is recovered at the outlet of the elements.

According to an advantageous variant, the heat-exchange gas ($EH_2(2)$) is the fuel (steam $H_2O$, or mixture of steam $H_2O$ and of hydrogen $H_2$, or mixture of steam $H_2O$ and of carbon dioxide $CO_2$) or the draining gas, such as air ($E(O_2)$).

Another subject of the invention is a method for producing electricity at high temperature, implemented in a solid oxide fuel cell (SOFC) described above, according to which:

the fuel ($EH_2(1)$) is supplied from the interconnectors of the electrochemical stages and it is distributed to the anodes of the cells, then the surplus fuel and the water produced ($SH_2(1)$) are recovered at the outlet of the anodes, the oxidizer, such as air, ($E(O_2)$), is supplied from the interconnectors of the electrochemical stages and it is distributed to the cathodes of the cells, then the surplus oxidizer ($S(O_2)$) is recovered at the outlet of the cathodes, a heat-exchange gas ($EH_2(2)$) is supplied from the interconnectors of the thermal regulation stages and it is distributed to the electrical contact elements, then it is recovered at the outlet of the elements.

The fuel is preferably hydrogen or methane ($CH_4$).

Advantageously, the supply of the fuel gas is connected in series to that of the heat-exchange gas.

According to one variant, the supply of the fuel gas may be in coflow to that of the heat-exchange gas.

Alternatively, the supply of the fuel gas is in counterflow to that of the heat-exchange gas.

Advantageously, an exothermic or endothermic chemical reaction may be carried out between the heat-exchange gas and the electrical contact elements.

"Cathode-supported cell" (CSC) is used here and in the context of the invention according to the definition already given in the field of high-temperature electrolysis HTE of water, that is to say to mean a cell in which the electrolyte and the oxygen electrode (anode) are arranged on the thicker hydrogen or carbon monoxide electrode (cathode) which thus serves as support.

DETAILED DESCRIPTION

Figure 4:
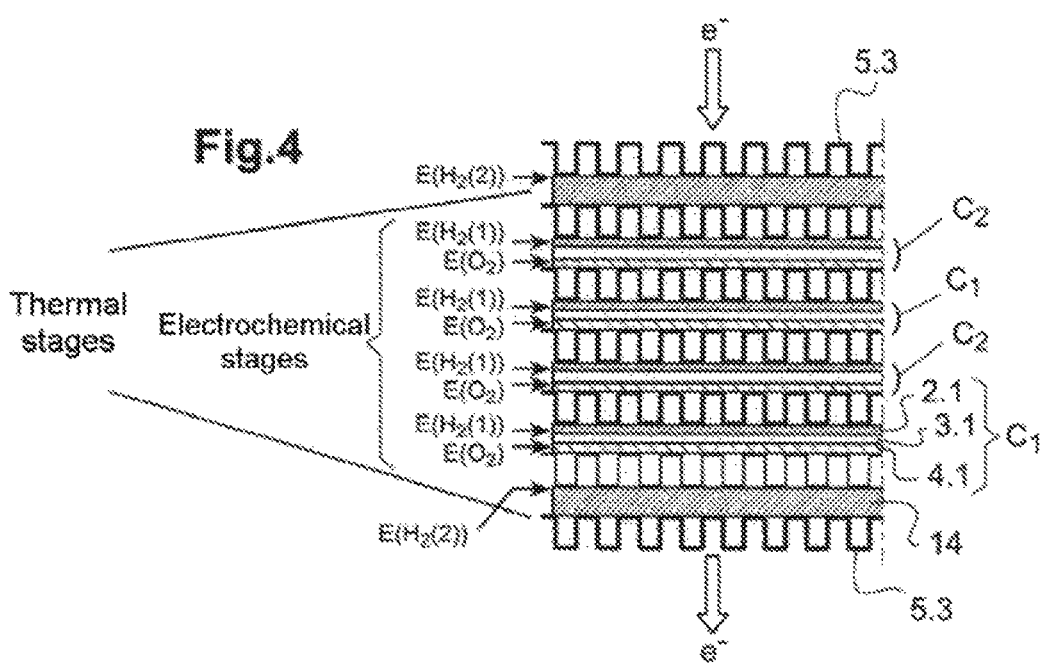
Figure 5:
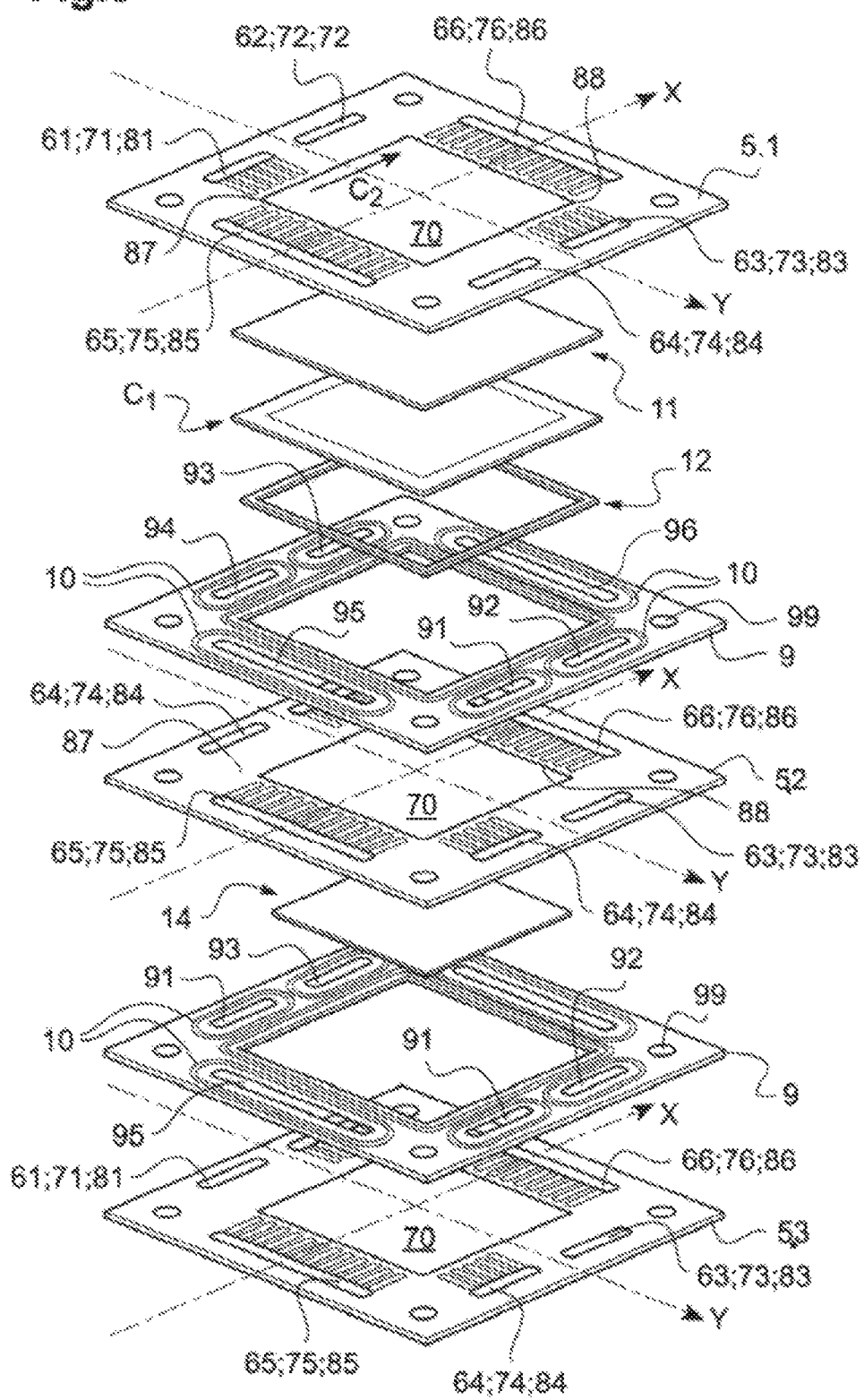
Figure 6A:
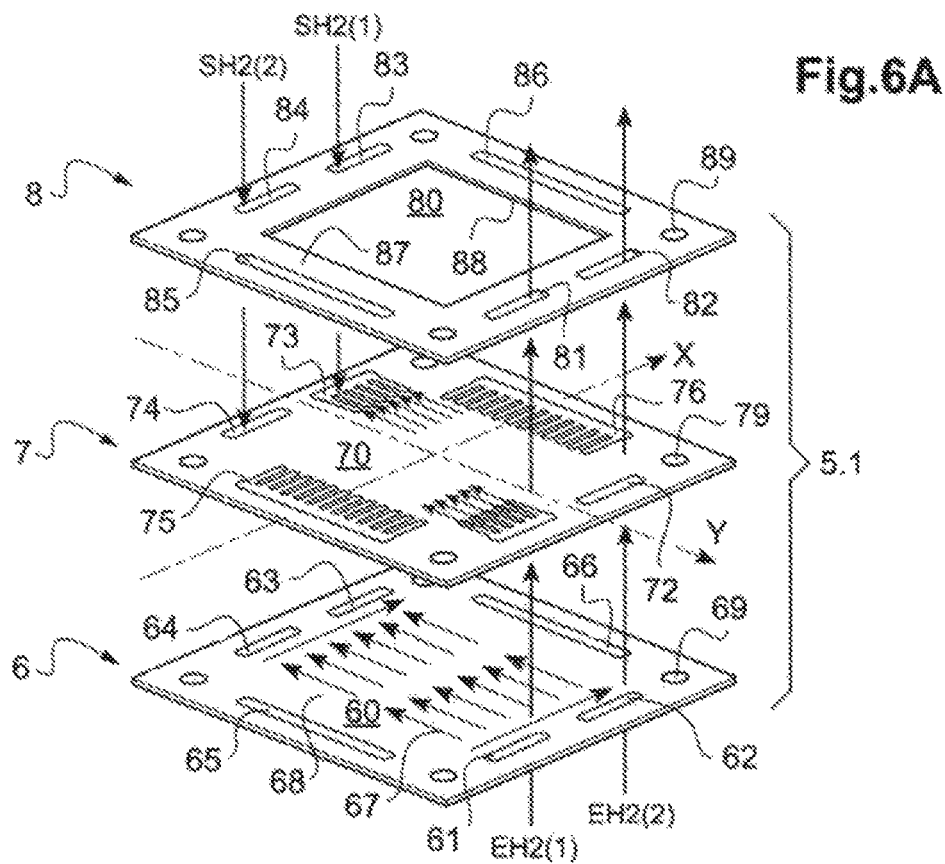
Figure 6B:
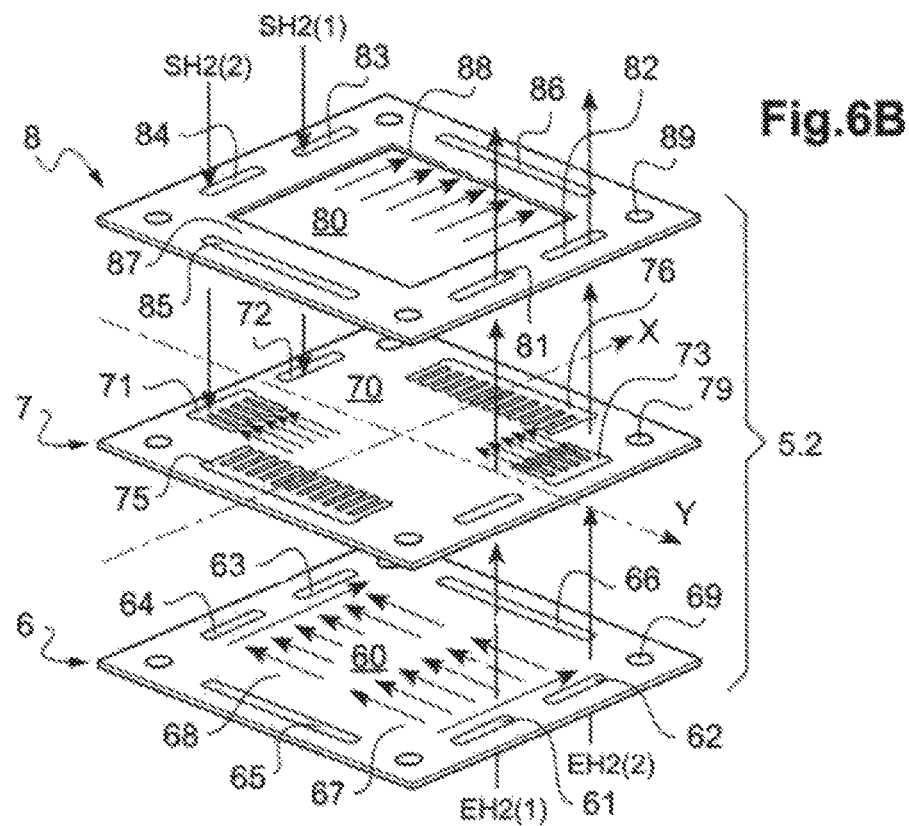

Other advantages and features of the invention will become more clearly apparent on reading the detailed non-limiting and illustrative description of exemplary embodiments of the invention given with reference to the following figures, in which:

FIG. 1 is a schematic view showing the operating principle of a high-temperature water electrolyzer;

FIG. 2 is a schematic exploded view of a part of a high-temperature steam electrolyzer comprising interconnectors according to the state of the art, FIG. 3 is a schematic exploded view of a part of a high-temperature SOFC fuel cell comprising interconnectors according to the state of the art, FIG. 4 is a section of an electrolysis reactor implementing a method for high-temperature electrolysis according to one mode of the invention, FIG. 5 is an exploded view of a part of an electrolysis reactor according to the invention with an electrolysis stage adjacent to a thermal regulation stage, FIGS. 6A and 6B are exploded views of an interconnector of an electrolysis stage according to the invention which enables a supply/recovery of the steam and the hydrogen produced, and a supply/recovery of the heat-exchange gas, the figures showing the supply, distribution and recovery of the steam and of the hydrogen produced in FIG. 6A and the heat-exchange gas in FIG. 6B, FIG. 6C is an exploded view of the interconnector according to FIGS. 6A and 6B, showing the supply, distribution and recovery of the draining gas and of the oxygen produced, FIG. 7A is a front view of an end metal sheet of an interconnector according to FIG. 6A, showing the supply, distribution and recovery of the steam and of the hydrogen produced, FIG. 7B is a front view of an end metal sheet of an interconnector according to FIG. 6B, showing the supply, distribution and recovery of the heat-exchange gas according to the invention, FIG. 7C is a front view of an end metal sheet of an interconnector according to FIG. 6A or 6B, showing the supply, distribution and recovery of the draining gas and of the oxygen produced, FIG. 7D is a perspective view of an interconnector according to FIG. 6A or 6B, FIG. 8 is an exploded view of an interconnector of a thermal regulation stage according to the invention, this figure showing the absence of port for the supply, distribution and recovery of the draining gas and of the oxygen at the thermal regulation stage, FIGS. 9A and 9B are detail views of a part of an interconnector according to the invention.

It is specified here that, in all of FIGS. 1 to 8, the symbols and arrows of supply of steam $H_2O$, of distribution and recovery of dihydrogen $H_2$ and of oxygen $O_2$ and of the current are shown for the purposes of clarity and precision, to illustrate the operation of a steam electrolysis reactor according to the state of the art and of a steam electrolysis reactor according to the invention.

It is also specified that all the electrolysers described are of solid oxide type (SOEC, acronym for Solid Oxide Electrolysis Cell) operating at high temperature. Thus, all the constituents (anode/electrolyte/cathode) of an electrolysis cell are ceramics. The high operating temperature of an electrolyzer (electrolysis reactor) is typically between 600° C. and 950° C.

Typically, the characteristics of an individual SOEC electrolysis cell suitable for the invention, of the cathode-supported type (CSC), may be those indicated as follows in the table below.

TABLE

| Electrolysis cell | Unit | Value |
|---|---|---|
| Cathode 2 | | |
| Constituent material | | Ni-YSZ |
| Thickness | µm | 315 |
| Thermal conductivity | W m$^{-1}$ K$^{-1}$ | 13.1 |
| Electrical conductivity | $\Omega^{-1}$ m$^{-1}$ | $10^5$ |
| Porosity | | 0.37 |
| Permeability | m$^2$ | $10^{-13}$ |
| Tortuosity | | 4 |
| Current density | A · m$^{-2}$ | 5300 |
| Anode 4 | | |
| Constituent material | | LSM |
| Thickness | µm | 20 |
| Thermal conductivity | W m$^{-1}$ K$^{-1}$ | 9.6 |
| Electrical conductivity | $\Omega^{-1}$ m$^{1}$ | 1 10$^4$ |
| Porosity | | 0.37 |
| Permeability | m$^2$ | $10^{-13}$ |
| Tortuosity | | 4 |
| Current density | A · m$^{-2}$ | 2000 |
| Electrolyte 3 | | |
| Constituent material | | YSZ |
| Thickness | µm | 90 µm in support electrolyte and 5 µm in support electrode |
| Resistivity | $\Omega$ m | 0.42 |

FIGS. 1 to 3 have already been described in detail in the preamble. They are therefore not described hereafter.

By convention, and in order to facilitate the reading of the circulations of the gases in the different figures, the following symbols are used:

$EH_2(1)$: denotes the circulation, through the stack, of the steam as "fuel" supplying the electrolysis cells C1, C2;

$SH_2(1)$: denotes the circulation, through the stack, of the hydrogen produced by the electrolysis cells C1, C2;

$EH_2(2)$: denotes the circulation, through the stack, of the heat-exchange gas supplying the thermal regulation stages;

$SH_2(2)$: denotes the circulation, through the stack, of the heat-exchange gas at the outlet of the thermal regulation stages;

$E(O_2)$: denotes the circulation, through the stack, of the draining gas supplying the electrolysis cells C1, C2;

$S(O_2)$: denotes the circulation, through the stack, of the oxygen produced at the electrolysis cells C1, C2.

In order to improve the management of the thermal operations of the electrolysis reactor of the electrochemical stages, more particularly those at the center of the stack which do not have the possibility of exchange with the outside environment, the inventors have wisely thought to integrate thermal regulation stages within the stack by employing flat metal sheet interconnectors whose structure is barely modified compared to those intended for the electrochemical stages, and by arranging electrical contact elements allowing the gases to pass instead of the electrolysis cells.

Thus, as illustrated in FIG. 4, the following steps are carried out simultaneously within the stack according to the invention:

the steam $EH_2(1)$ is supplied from the interconnectors 5.1, 5.2 of the electrochemical stages as fuel, and it is distributed to the cathodes of the electrolysis cells C1, C2, then the hydrogen $H_2$ produced $SH_2(1)$ is recovered at the outlet of the cathodes 2.1, 2.2, a draining gas, such as air, $E(O_2)$, is supplied from the interconnectors 5.1, 5.2 of the electrochemical stages and it is distributed to the anodes 4.1, 4.2 of the cells, then the oxygen $O_2$ produced and where appropriate the draining gas $S(O_2)$ is recovered at the outlet of the anodes, a heat-exchange gas $EH_2(2)$ is supplied from the interconnectors 5.2, 5.3 of the thermal regulation stages and it is distributed to the electrical contact elements 14, then it is recovered at the outlet of these elements 14 $SH_2(2)$.

Thus, according to the invention, the majority of the usual electrochemical stages of an EHT reactor stack are retained, which stages are intended for the electrolysis of the steam, and stages with a thermal regulation function are added thereto, instead of electrochemical stages, in order to regulate the heat of the reactions in these zones.

According to the invention, it is provided that the circuit of the thermal regulation stages is swept with a sufficiently reducing heat-exchange gas to avoid the oxidation of the contact elements 14. Thus, the heat-exchanger may advantageously be a mixture of steam and hydrogen. In this case, the hydrogen is present at at least 10%, in order to avoid the oxidation of the contact elements 14, especially in the form of a nickel grid.

FIG. 5 shows a schematic representation of a part of a high-temperature solid oxide electrolyzer (SOEC) according to the invention.

This electrolyzer electrolysis reactor comprises an alternating stack of an individual electrolysis cell of SOEC type (C1) formed from a cathode 2.1, 2.2, from an anode 4.1, 4.2, and from an electrolyte 3.1, 3.2, inserted between the cathode and the anode, and from a metal grid 14.

This metal grid provides electrical continuity in series through the thermal regulation stage.

The electrochemical stage comprises two electrical and fluid interconnectors 5.1, 5.2, arranged either side of the individual cell C1 with the cathode in electrical contact with the lower face of the above interconnector 5.1 and the anode in electrical contact with the upper face of the below interconnector 5.2.

The thermal regulation stage also comprises two electrical and fluid interconnectors 5.2, 5.3, the above one of which 5.2 is shared with the electrochemical stage. The two interconnectors 5.2, 5.3 are arranged on either side of the metal grid 14.

As shown in FIG. 5, insulation and leaktightness frames 9 are also provided, making it possible to provide electrical insulation between interconnectors 5.1 and 5.2 on the one hand and between interconnectors 5.2, 5.3 on the other. It should be noted that, between the two interconnectors 5.2 and 5.3, the frame 9 serves first and foremost for leaktightness, since electrical insulation is not required on the stage intended for thermal management.

Each frame 9 is pierced with ports 99, suitable for accommodating rods for fixing the stack, and also seals 10 provided to produce leaktightness around the ports 91, 92, 93, 94, 95, and 96 for supplying the gases $H_2O$ and air and for recovering the gases produced $H_2$, $O_2$ with air, and also around the manifolds intended for the heat-exchange gas.

A contact layer 11, such as a metal grid made of nickel, makes it possible to provide contact between the cathode of the cell C1 and the above interconnector 5.1.

Another seal 12 is also provided at the periphery of the anode of the cell, to provide leaktightness for the oxygen produced.

The assembly of the stack comprising the electrolysis cell C1 and the metal grid 11 for passage of the heat-exchange gas is passed through by the same electrical current.

In the reactor according to the invention, all the cathode compartments 50 of the electrochemical stages, in which the steam $H_2O$ supplied and the hydrogen $H_2$ produced circulate, communicate with one another.

Similarly, all the thermal regulation stages, in which the heat-exchange gas circulates, communicate with one another.

According to the invention, an interconnector 5.3 intended for a thermal regulation stage is different from an interconnector 5.1 intended for an electrochemical stage, in order to be able to solely carry out a supply of heat-exchange gas, without introducing fuel, at a metal grid 14.

FIGS. 6A to 6C each show an exploded view of an interconnector 5.1 or 5.2 of an electrochemical stage according to the invention, making it possible to provide both:

the supply of steam $H_2O$ as "fuel", the circulation of the steam and of the hydrogen produced at the cell C1, the recovery of the hydrogen produced, and also the supply and recovery of the oxygen $O_2$ produced within the stack of an electrolysis reactor, the supply of heat-exchange gas, the circulation of this heat-exchange gas at a metal grid 14, and also the recovery thereof, having circulated over a metal grid 14 within the stack of an electrolysis reactor.

Each interconnector 5.1, 5.2 intended for an electrochemical stage makes it possible to provide a circulation of the gas $(H_2O/H_2)$ to the cathodes of the cells at 90° cross-current with the circulation of the recovered gas $(O_2)$ and the draining gas at the anode of the cells.

The interconnector 5.1 or 5.2 consists of three flat metal sheets 6, 7, 8, elongated along two axes of symmetry (X, Y) orthogonal to one another, the flat metal sheets being laminated and assembled together by welding. A central metal sheet 7 is inserted between a first 6 and a second 8 end metal sheet.

The first 6 end metal sheet is intended to come into mechanical contact with the plane of a cathode 2.1 of the individual electrolysis cell C1 and the central metal sheet 7 is intended to come into mechanical contact with the plane of an anode 4.1 of an adjacent individual electrolysis cell, each of the two adjacent individual electrolysis cells (C1, C2) of SOEC type being formed from a cathode 2.1, 2.2, from an anode 4.1, 4.2, and from an electrolyte 3.1, 3.2, inserted between the cathode and the anode.

Each of the three flat metal sheets 6, 7, 8 comprises a central part 60, 70, 80.

The central parts 60, 70 of the central metal sheet 7 and of the first end metal sheet 6 are not pierced, while the central part 80 of the second end metal sheet 80 is pierced.

Each metal sheet 6, 7, 8 is pierced, at the periphery of the central part thereof, with six ports 61, 62, 63, 64, 65, 66; 71, 72, 73.74, 75, 66; 81, 82, 83, 84, 85, 86.

The first 61, 71, 81 to fourth 64, 74, 84 ports of each metal sheet are elongated over a length corresponding to a portion of the length of the central part 60, 70, 80 along one of the axes X of the metal sheets, and are distributed pairwise on either side of said axis X.

The fifth 65, 75, 85 port is elongated over a length corresponding substantially to the length of the central part 60, 70, 80 along the other of the axes Y.

The sixth 66, 76, 86 port is elongated over a length corresponding substantially to the length of the central part 60, 70, 80 along the other of the axes Y.

The first 6 end metal sheet also comprises a seventh 67 and an eighth 68 port arranged symmetrically on either side of the axis X, inside its first to fourth ports 61 to 64, and are elongated over a length corresponding substantially to the length of the central part along the axis X.

The second 8 end metal sheet also comprises a seventh 87 and an eighth port arranged symmetrically on either side of the axis Y inside, respectively, its fifth 85 and its sixth 86 port, and elongated over a length corresponding substantially to the length of the central part along said axis Y.

As can be seen in FIG. 6A, the first 71, third 73, fifth 75 and sixth 76 ports of the central metal sheet 7 are widened relative, respectively, to the first 61, 81, third 63, 83, fifth 65, 85 and sixth 66, 86 ports of each end metal sheet 6, 8.

The second 62, 72, 82 and fourth 64, 74, 84 ports of the three metal sheets are of substantially identical dimensions to one another.

The lamination and the assembly of the three metal sheets 6, 7, 8 with one another are carried out such that:

each of the first to sixth ports 61 to 66 of one of the three metal sheets is individually in fluid communication respectively with one of the corresponding first to sixth ports 71 to 76 and 81 to 86 of the two other metal sheets 7, 8, the first port 61 of the first 6 end metal sheet is in fluid communication with the seventh port 67 of the first 6 end metal sheet via the first port 71 of the central metal sheet 7, the third port 63 of the first 6 end metal sheet is in fluid communication with the eighth port 68 of the first 6 end metal sheet via the third port 73 of the central metal sheet 7, the fifth 85 and the seventh 87 ports of the second 8 end metal sheet are in fluid communication via the fifth 75 port of the central metal sheet 7, the sixth 86 and the eighth 88 ports of the second 8 end metal sheet are in fluid communication via the sixth 76 port of the central metal sheet 7.

FIGS. 9A and 9B show in detail the production of the comb formed by the tongues of metal sheet 710 at the widened slit 71 of the central metal sheet and its arrangement between the two end metal sheets 6, 8 in order to enable the supply of an electrolysis cell, here with steam $H_2O$, or of a metal grid 14 at a thermal regulation stage, as detailed below. Thus, the comb formed 710, 711 enables the steam to pass from the supply manifold 61, 71, 81 to the distribution slit 67, by passing into the space between the two end metal sheets 6, 8. The thickness of the central metal sheet 7 at this comb 710, 711 provides it with a spacer function and thereby guarantees the height of the passage for the steam into the space between the end metal sheets 6, 8. Such a passage of gases according to the invention via the inside of the interconnector 5.1 has the advantage of liberating a flat surface for producing seals. In addition, by virtue of these comb forms for the widened slits 71, 75 a homogeneous distribution is obtained of each gas ($H_2O$, air) over each electrolysis cell and over each metal grid of the thermal stage, and by virtue of these comb forms for the widened slits 73, 76 a recovery is obtained of the gas produced ($H_2$, $O_2$) or of the heat-exchange gas. These homogeneous distributions or recoveries or, in other words, these distributions or recoveries which are uniform in terms of flow rate, are shown in the different FIGS. 6A to 8 in the form of small arrows spaced apart from one another.

In order to produce the interconnector 5.2 represented in FIG. 6B, which makes it possible both to convey the draining gas to the cell C1 and the heat-exchange gas to the metal grid 14, the same three flat metal sheets 6, 7, 8 are used as those used for producing the interconnector 5.1, but the central metal sheet 7 is merely turned upside down before its lamination and assembly with the two end metal sheets 6, 8.

Thus, in the interconnector 5.2, the three metal sheets 6, 7, 8 are laminated and assembled together such that:

each of the first to sixth ports 61 to 66 of one of the three metal sheets is individually in fluid communication respectively with one of the corresponding first to sixth 71 to 76 and 81 to 86 ports of the two other metal sheets 7, 8, the second port 62 of the first 6 end metal sheet is in fluid communication with the seventh 67 port of the first 6 end metal sheet via the third 73 port of the central metal sheet 7, the fourth port 64 of the first 6 end metal sheet is in fluid communication with the eighth 68 port of the first 6 end metal sheet via the first 71 port of the central metal sheet 7, the fifth 85 and the seventh 87 ports of the second 8 end metal sheet are in fluid communication via the fifth 75 port of the central metal sheet 7, the sixth 86 and the eighth 85 ports of the second 8 end metal sheet are in fluid communication via the sixth 76 port of the central metal sheet 7.

In order to produce the interconnector 5.3 represented in FIG. 8 which makes it possible not to convey draining gas or oxygen to or to recover oxidizer gas at the metal grid 14, the same three flat metal sheets 6, 7, 8 are used as those used for producing the interconnectors 5.1 and 5.2, retaining all the ports intended for the supply/recovery of the gases with the exception of the ports 87, 88 which are removed.

In other words, an interconnector 5.3 is created intended for a thermal regulation stage, starting from exactly the same flat metal sheets 6, 7, 8 constituting the interconnectors 5.1, 5.2 intended for an electrochemical stage, and removing solely the ports 87, 88 or slits usually intended for the function of supplying draining gas and of recovering the oxygen $O_2$ produced.

Thus, according to the invention, by means of an interconnector identical in its structure to laminated and assembled flat metal sheets and in its thicknesses and forms to those intended for the electrochemical stages, a stage intended for thermal regulation is produced.

By virtue of the invention, an alternating stack of thermal regulation stages and of electrochemical stages is thus obtained, the thermal regulation of which, in particular in the center of the stack, is very effective, and the production cost of which is less compared to the solutions according to the state of the art, since all the interconnectors 5.1, 5.2, 5.3 are produced with the same flat metal sheets 6, 7, 8, and thus according to the same manufacturing ranges, and some electrolysis cells are replaced by metal grids which provide electrical continuity through the stack.

The operating method of an electrolysis reactor according to the invention, as has just been described, will now be described with reference to FIGS. 6A to 8.

The first 61, 71, 81 ports of the interconnectors 5.1 to 5.3 are supplied with steam $EH_2(1)$ and simultaneously the second 62, 72, 82 ports of the interconnectors 5.1 to 5.3 are supplied with heat-exchange gas $EH_2(2)$.

The heat-exchange gas $EH_2(2)$ passes through the interconnector 5.1 without being distributed to the cathode 2.1 of the cell C1. It supplies the ports 62, 73 and 82 of the interconnector 5.2.

Similarly, the steam $EH_2(1)$ passes through the interconnector 5.2 without being distributed on the metal grid 14.

The path, within an interconnector 5.1, of the steam injected and of the hydrogen produced, is illustrated schematically in FIGS. 6A and 7A.

The path, within an interconnector 5.2, of the heat-exchange gas within an interconnector 5.2, is schematically illustrated in FIGS. 6B and 7B.

In addition, the fifth 65, 75, 85 ports of the three metal sheets 8 of each interconnector 5.1, 5.2, 5.3 are supplied with a draining gas $E(O_2)$, such as air.

The path of the air as draining gas injected and of the oxygen produced within an interconnector 5.1 or 5.2 is schematically illustrated in FIG. 6C.

Due to the absence of the ports 87, 88 within the interconnector 5.3, the draining gas is not distributed/recovered on the metal grid 14.

The hydrogen produced $SH_2(1)$ by the steam electrolysis at the cell C1 is thus recovered in the third 63, 73, 83 ports of the interconnector 5.1.

The heat-exchange gas $SH_2(2)$ having circulated for the purposes of thermal management at the metal grid 14 is separately recovered in the fourth 64, 84 ports of the end metal sheets and the first port 71 of the interconnector 5.2.

Simultaneously, the oxygen $O_2$ produced $S(O_2)$ is recovered in the sixth 66, 76, 86 ports of the three metal sheets 8 of each interconnector 5.1, 5.2.

The supply of the steam and the recovery of the hydrogen produced and also the supply of draining gas and the recovery of oxygen produced, shown in FIGS. 6A to 6C, constitute a co-current circulation of fuel/heat-exchange gas of a cell C1 relative to the adjacent metal grid 14, and a cross-current circulation with the shared circulation of draining gas/oxygen produced.

With the two types of interconnectors 5.1, 5.2, it is thus possible to produce, as a variant, a counter-current circulation of fuel/heat-exchange gas of a cell C1 relative to the adjacent metal grid 14, and a cross-current circulation with the circulation of draining gas/oxygen produced.

The three flat metal sheets 6, 7, 8 constituting each interconnector 5.1, 5.2, 5.3 according to the invention are thin flat metal sheets, pierced and assembled with one another by welding. The thin metal sheets are preferably metal sheets less than 3 mm thick, typically with a thickness of the order of 0.2 mm. All the welds between metal sheets produced upon manufacture, outside of any operation of the electrolyzer, may advantageously be produced according to a transmission laser technique, which is possible due to the small thickness of the thin metal sheets, typically of the order of 0.2 mm.

All the metal sheets are advantageously made of ferritic steel with approximately 20% chromium, preferably made of CROFER® 22APU or FT18TNb, based on nickel of Inconel® 600 or Haynes® type in thicknesses typically of between 0.1 and 1 mm.

Assembly by weld lines is around the ports between flat metal sheets 6, 7, 8 guarantees good leaktightness during operation of the electrolyzer between the steam $EH_2(1)$ conveyed to the interconnectors 5.1 as "fuel", the heat-exchange gas $EH_2(2)$ conveyed to the interconnectors 5.2, 5.3 as thermal management, the hydrogen $SH_2(1)$ recovered at the interconnectors 5.1, the heat-exchange gas $SH_2(2)$ recovered at the interconnectors 5.2, the draining gas conveyed $E(O_2)$ and the oxygen $S(O_2)$ recovered. The weld lines are illustrated in FIGS. 10A to 10C.

As illustrated on all the FIGS. 5 to 8, the three metal sheets 6, 7, 8 are pierced at their periphery by additional ports 69, 79, 89 suitable for accommodating fixing rods. These fixing rods make it possible to apply a retention force to the stack of the different components both of the electrochemical stages and of the thermal regulation stages of the electrolysis reactor.

Other variants and improvements may be envisaged within the context of the invention.

Thus, if, in the illustrated embodiment, the heat-exchange gas is of the steam with hydrogen type, it is equally possible to envisage that the draining gas is also the heat-exchange gas. More generally, the heat-exchange gas may be any gas, with the proviso that it is suited to the material(s) of the contact elements 14, that is to say that it does not oxidize the latter.

It could also be possible to use, to produce a dedicated interconnector, to laminate and to assemble three flat metal sheets such as those 6, 7, 8 illustrated, but with the proviso of removing the ports 67, 68 of the interconnector 5.2 intended for the supply of the steam/hydrogen and the recovery of the hydrogen produced, and of retaining 87 and 88 on the interconnector 5.3 at a thermal regulation stage. According to this variant, thermal regulation would be carried out by the draining gas (or oxidizing gas in SOFC cell). In this case, the metal grid 14 is either a grid resistant to oxidation or an electrical contact provided directly by welding two successive interconnectors 5.2, 5.3 to one another. The welds between these two interconnectors 5.2, 5.3 must then provide leaktightness and the passage of the current.

The electrochemical stages and the thermal regulation stages may be in parallel if the manifolds for supplying/recovering the gases remain independent or in series if they are connected to one another outside the stack.

Connecting in series between electrochemical stages and thermal regulation stages makes it possible to effectively preheat the steam intended for the electrolysis of the water before its entry onto the cathodes of the electrolysis cells.

The invention claimed is:

1. A high-temperature electrolysis reactor, comprising an alternating stack of two groups of distinct stages, including:
   a group of a plurality of electrochemical stages, each consisting of
      an individual electrolysis cell of SOEC solid oxide type, formed from a cathode, an anode and an electrolyte inserted between the cathode and the anode, and
      two interconnectors, each suitable for electrical and fluid interconnection, arranged on either side of the individual electrolysis cell, and
   a group of at least one thermal regulation stage, consisting of
      at least one electrical contact element allowing gases to pass, and
      two interconnectors, each suitable for electrical and fluid interconnection, arranged on either side of the at least one electrical contact element,
   wherein
   the interconnectors of the electrochemical stages and the at least one thermal regulation stage are suitable for both (i) and (ii):
      (i) circulating, through the stack, steam or a mixture of steam and carbon dioxide, a draining gas, and a heat-exchange gas, and
      (ii) recovering hydrogen or synthesis gas produced at the cathodes of the electrolysis cells, oxygen produced at the anodes of the electrolysis cells, and where appropriate the draining gas, and the heat-exchange gas at an outlet of the at least one electrical contact element,
   the interconnectors of the electrochemical stages are also suitable for distributing both steam or the mixture of steam and carbon dioxide to the cathodes of the electrolysis cells, and the draining gas to the anodes of the electrolysis cells, and
   the interconnectors of the at least one thermal regulation stage are suitable for distributing solely the heat-exchange gas to the at least one electrical contact element.

2. The high-temperature electrolysis reactor of claim 1, wherein the at least one electrical contact element is a metal grid.

3. The high-temperature electrolysis reactor of claim 1, wherein
the interconnectors of the electrochemical stages each consist of a device consisting of three flat metal sheets of a first end metal sheet, a second end metal sheet, and a central metal sheet,
the three flat metal sheets are elongated along two axes of symmetry (X, Y) orthogonal to one another,
one of the first and second end metal sheets is configured to come into mechanical contact with a plane of the cathode of the individual electrolysis cell and the other of the first and second end metal sheets is configured to come into mechanical contact with a plane of the anode of the adjacent individual electrolysis cell,
central parts of the central metal sheet and the first end metal sheet are not pierced, while a central part of the second end metal sheet is pierced,
each of the three flat metal sheets is pierced, at a periphery of the central part thereof, with six ports, the first to fourth ports of each flat metal sheet being elongated over a length corresponding to a portion of a length of the central parts along one of the axes X of the flat metal sheets and being distributed in pairs on either side of said axis X, while the fifth and sixth ports are elongated over a length corresponding substantially to a length of the central parts along the other of the axes Y,
the first end metal sheet also comprises a seventh and an eighth port arranged symmetrically on either side of the axis X, inside its first to fourth ports, and elongated over a length corresponding substantially to a length of the central part along the axis X,
the second end metal sheet also comprises a seventh and an eighth port arranged symmetrically on either side of the axis Y, inside its fifth and sixth ports, respectively, and elongated over a length corresponding substantially to the length of the central part along said axis Y,
the first, third, fifth and sixth ports of the central metal sheet are widened relative to the first, third, fifth and sixth ports of each end metal sheet, respectively, while the second and fourth ports of the three flat metal sheets are of substantially identical dimensions to one another,
all the widened ports of the central metal sheet comprise tongues of metal sheets spaced apart from one another, forming a comb with a plurality of slits, each slit between an edge of the widened port and the adjacent tongue or between two consecutive tongues opening onto one inner port of the first or second end metal sheet, and
the three flat metal sheets are laminated and assembled together such that:
the tongues of metal sheets form spacers between the first and second end metal sheets, between the first and seventh ports of the first end metal sheet, between the third and eighth ports of the first end metal sheet, between the fifth and seventh ports of the second end metal sheet, and between the sixth and eighth ports of the second end metal sheet,
each of the first to sixth ports of one of the three flat metal sheets is individually in fluid communication with one of the corresponding first to sixth ports of the two other metal sheets,
the first or alternatively the second port of the first end metal sheet is in fluid communication with the seventh port of the first end metal sheet via the slits of the first widened port of the central metal sheet,
the third or alternatively the fourth port of the first end metal sheet is in fluid communication with the eighth port of the first end metal sheet via the slits of the third widened port of the central metal sheet,
the fifth and the seventh ports of the second end metal sheet are in fluid communication via the slits of the fifth widened port of the central metal sheet, and
the sixth and the eighth ports of the second end metal sheet are in fluid communication via the slits of the sixth widened port of the central metal sheet.

4. The high-temperature electrolysis reactor of claim 3, wherein
at least one of the two interconnectors of the at least one thermal regulation stage is constituted from three flat metal sheets of a first end metal sheet, a second end metal sheet, and a central metal sheet, and
the three flat metal sheets of the at least one interconnector of the at least one thermal regulation stage are identical to the three flat metal sheets of the interconnectors of the electrochemical stages except that the second end metal sheet of the at least one interconnector of the at least one thermal regulation stage does not comprise the seventh and the eighth ports.

5. The high-temperature electrolysis reactor of claim 3, wherein the two interconnectors of the same electrochemical stage each are constituted from three identical flat metal sheets, but with the central metal sheet of one of the interconnectors turned upside down relative to the central metal sheet of the other interconnector.

6. The high-temperature electrolysis reactor of claim 1, wherein a number of the at least one thermal regulation stage is different from a number of the electrochemical stages.

7. The high-temperature electrolysis reactor of claim 1, wherein a number of the at least one thermal regulation stage is higher at the center of the stack than at the ends of the stack.

8. The high-temperature electrolysis reactor of claim 1, wherein the at least one thermal regulation stage is not visible from the outside of the stack.

9. A high-temperature fuel cell, comprising an alternating stack of two groups of distinct stages, including:
a group of a plurality of electrochemical stages, each consisting of
an individual electrochemical cell of SOFC solid oxide type, formed from a cathode, an anode and an electrolyte inserted between the cathode and the anode, and
two interconnectors, each suited for electrical and fluid interconnection, arranged on either side of the individual electrochemical cell, and
a group of at least one thermal regulation stage, consisting of
at least one electrical contact element allowing gases to pass, and
two interconnectors, each suitable for electrical and fluid interconnection, arranged on either side of the at least one electrical contact element,
wherein
the interconnectors of the electrochemical stages and the at least one thermal regulation stage are suitable for both (i) and (ii):
(i) circulating, through the stack, a fuel, an oxidizer, and a heat-exchange gas, and
(ii) recovering a surplus fuel and water produced at the anodes of the electrochemical cells, a surplus oxidizer at the cathodes of the electrochemical cells, and the heat-exchange gas at an outlet of the at least one electrical contact element, the interconnectors of the electrochemical stages are also suitable for distributing both the fuel to the anodes of the electrochemical cells and the oxidizer to the anodes of the electrochemical cells, and the interconnectors of the at least one thermal regulation are suitable for distributing solely the heat-exchange gas to the at least one electrical contact element.

10. A method for electrolysis of steam or co-electrolysis of a mixture of steam and carbon dioxide in the high-temperature electrolysis reactor of claim 1, the method comprising:

supplying the steam or the mixture from the interconnectors of the electrochemical stages as fuel, and distributing the fuel to the cathodes of the electrolysis cells, then recovering hydrogen or the synthesis gas at an outlet of the cathodes, supplying the draining gas from the interconnectors of the electrochemical stages and distributing the draining gas to the anodes of the electrolysis cells, then recovering oxygen produced and where appropriate the draining gas at an outlet of the anodes, and supplying the heat-exchange gas from the interconnectors of the at least one thermal regulation stage and distributing the heat-exchange gas to the at least one electrical contact element, then recovering the heat-exchange gas at the outlet of the at least one electrical contact element.

11. The method of claim 10, wherein the heat-exchange gas is the fuel or the draining gas.

12. The method of claim 10, wherein the supplying of the fuel is connected in series to the supplying of the heat-exchange gas.

13. The method of claim 10, wherein the supplying of the fuel is in coflow to the supplying of the heat-exchange gas.

14. The method of claim 10, wherein the supplying of the fuel is in counterflow to the supplying of the heat-exchange gas.

15. The method of claim 10, wherein an exothermic or endothermic chemical reaction is carried out between the heat-exchange gas and the at least one electrical contact element.

16. A method for producing electricity at high temperature in the high-temperature electrolysis reactor of claim 2, the method comprising:

supplying a fuel from the interconnectors of the electrochemical stages and distributing the fuel to the anodes of the electrolysis cells, then recovering a surplus fuel and water produced at an outlet of the anodes, supplying an oxidizer from the interconnectors of the electrochemical stages and distributing the oxidizer to the cathodes of the electrolysis cells, then recovering a surplus oxidizer at an outlet of the cathodes, and supplying the heat-exchange gas from the interconnectors of the at least one thermal regulation stage and distributing the heat-exchange gas to the at least one electrical contact element, then recovering the heat-exchange gas at the outlet of the at least one electrical contact element.

17. The method of claim 16, wherein the fuel is hydrogen or methane.

* * * * *